S. D. LOCKE.
Chain-Links and Chain.

No. 160,107. Patented Feb. 23, 1875.

WITNESSES
Wm E Chaffee
Harry Coleman

INVENTOR
S. D. Locke
By his atty
R. D. O. Smith ATTORNEY

THE GRAPHIC CO. PHOTO-LITH. 39 & 41 PARK PLACE, N.Y.

UNITED STATES PATENT OFFICE.

SYLVANUS D. LOCKE, OF HOOSICK FALLS, NEW YORK.

IMPROVEMENT IN CHAIN-LINKS AND CHAINS.

Specification forming part of Letters Patent No. 160,107, dated February 23, 1875; application filed December 12, 1874.

*To all whom it may concern:*

Be it known that I, SYLVANUS D. LOCKE, of Hoosick Falls, in the county of Rensselaer and State of New York, have invented a new and useful Improvement in Chains; and I do hereby declare the following to be a full, clear, and exact description of the same, reference being had to the accompanying drawings, in which—

Figure 1:
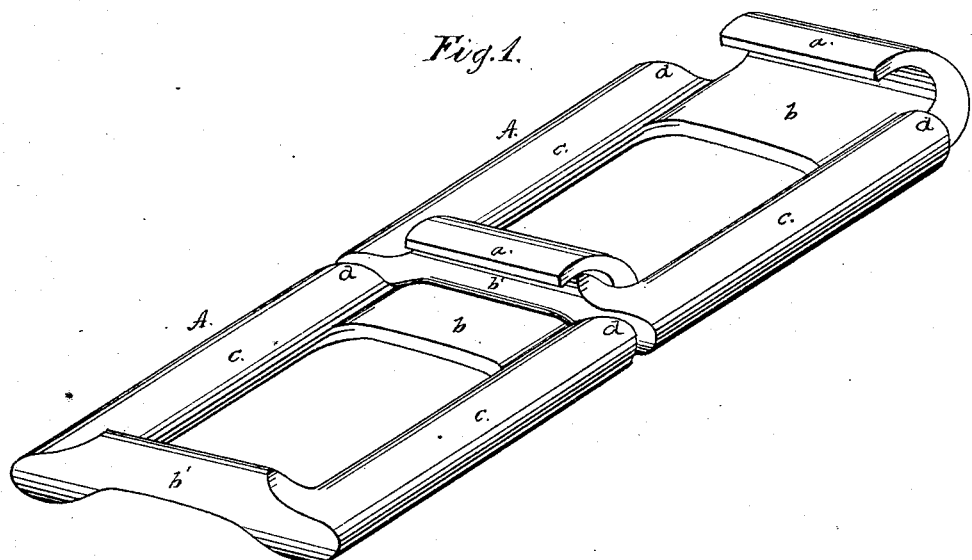
Figure 2:
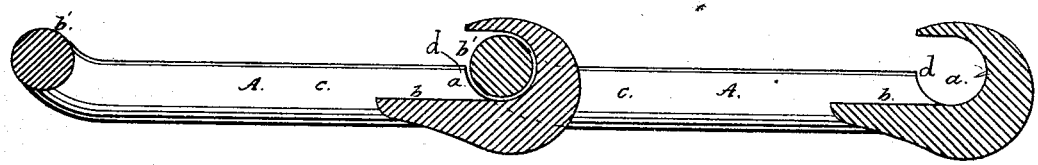
Figure 3:
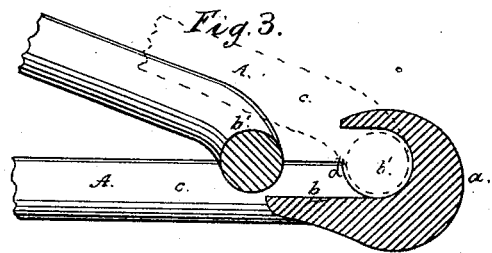
Figure 4:
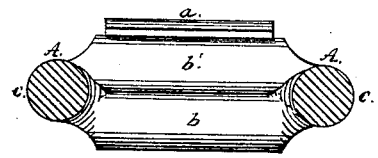

Figure 1 is a perspective view of my invention. Fig. 2 is a longitudinal section of the same. Fig. 3 is a similar section, showing the position of insertion. Fig. 4 is a transverse section of the same.

This invention relates to a method of constructing a chain with links, each individually detachable from its adjoining links when brought to a certain relative position thereto. The object of this improvement is to construct a chain with links detachable at any point, so that when desired the chain can be divided at any part of its length. This is particularly useful for endless chains employed for transmitting motion, as the reel-chains of harvesters, &c.

That others may fully understand my improvement, I will particularly describe it.

My chain is composed of the links A A, each having at one end (which, for convenience, may be called the forward end) a cross-bar, $b$, slightly depressed below, and, at the other or rear end, a cross-bar, $b'$, slightly elevated above the side bars $c$. From the forward bar $b$ springs forward, and thence upware and backward, a semicircular hook, $a$, of the proper size to retain a rear bar, $b'$. The hook should terminate immediately over, or a little in rear of, its spring line; and its width should nearly equal the distance between the side bars. The side bars terminate forward, so that their ends or shoulders $d$ shall continue or extend the semicircle of the inner face of the hook to, or nearly to, three-fourths of a circle.

It will be seen that if the forward bar be depressed, as I prefer, one-half of its diameter below the side bars, the hook springing from it is elevated one-half its diameter above, and that the hook and its rear bar is equally eccentric to the side bars, and in the same direction. This latter result is necessary if it is desired to have the side bars of adjacent links in line.

The hook side of the link, or that side on which the link appears, I denominate the upper side or face, and the opposite side I call the under side or back.

To join or couple two links it is only necessary to turn them face to face, with hooks opposite, as shown in Figs. 3 and 4, when the forward bar $b$ and the rear $b'$ will be eccentric in the same direction, and the former will easily enter the hook. If, now, the links be opened to their position when in use in a chain, as shown in Fig. 1, they cannot be coupled, because the side bars are now in a line, and when in a line the hook will have to open to twice, or nearly twice, its present extent to allow them to pass, and the links to uncouple.

By swinging a link over face to face to its adjacent link the side bars of one are above the side bars of the other, and the links may be uncoupled, and in no other position can they be disjointed. So, and with greater facility, may a chain be lengthened or shortened, and divided or joined, as the varying exigencies of their use may require, without the danger of breaking the links, or the use of the cold-chisel and hammer.

It will be observed that the cross-bars need not be eccentric throughout their entire extent to allow them to uncouple, as described.

The link A may be of any other form that will not interfere with its mechanical functions; but I prefer the rectangular form for most purposes.

Having thus described my invention, what I claim is—

1. A chain link, having its end bars eccentric to the side bars reversely to each other, one of said end bars being provided with a hook, substantially as and for the purpose specified.

2. A chain-link composed of the side bars $c\ c$, the bar $b'$ at one end, and the bar $b$, having the hook $a$, at the other, the bar $b$ being below, and the bar $b'$ above, the plane of the side bars, substantially as and for the purpose specified.

S. D. LOCKE.

Witnesses:
 I. B. SURDAMS,
 THOMAS P. HEWITT.